(12) United States Patent
Bruwer

(10) Patent No.: US 7,915,765 B2
(45) Date of Patent: Mar. 29, 2011

(54) DUAL REFERENCE CAPACITIVE SENSING USER INTERFACE

(75) Inventor: Frederick Johannes Bruwer, Paarl (ZA)

(73) Assignee: Azoteq (Pty) Ltd., Paarl (ZA)

( * ) Notice: Subject to any disclaimer, the term of this patent is extended or adjusted under 35 U.S.C. 154(b) by 0 days.

(21) Appl. No.: 12/833,966

(22) Filed: Jul. 10, 2010

(65) Prior Publication Data

US 2010/0271109 A1    Oct. 28, 2010

Related U.S. Application Data

(63) Continuation of application No. 12/335,474, filed on Dec. 15, 2008, now Pat. No. 7,755,219, which is a continuation of application No. 11/406,491, filed on Apr. 19, 2006, now Pat. No. 7,466,040.

(30) Foreign Application Priority Data

Apr. 19, 2005  (ZA) .................................. 2005/03143

(51) Int. Cl.
*H01H 35/00*    (2006.01)
*H01H 83/00*    (2006.01)

(52) U.S. Cl. ........................................................ 307/116
(58) Field of Classification Search .................. 307/116, 307/117, 132 EA
See application file for complete search history.

(56) References Cited

U.S. PATENT DOCUMENTS 4,580,038 A * 4/1986 O'Loughlin .................. 219/506
6,249,089 B1 * 6/2001 Bruwer ...................... 315/200 A

* cited by examiner

*Primary Examiner* — Jared J Fureman
*Assistant Examiner* — Carlos Amaya
(74) *Attorney, Agent, or Firm* — Jones, Tullar & Cooper, PC

(57) ABSTRACT

A module for controlling power supply to a load in a product which includes a microchip, and an electromechanical switch and a proximity/touch sensor connected to the microchip, preferably to the same input. The switch is primarily used to activate or deactivate the load and the proximity/touch sensor to vary the effect of operating the switch, or to control additional functions such as the activation of a signal, typically a light signal, which helps to locate the product, particularly in the dark, and to vary the duration of an automatic time-out period at the end of which the load is deactivated.

17 Claims, 9 Drawing Sheets

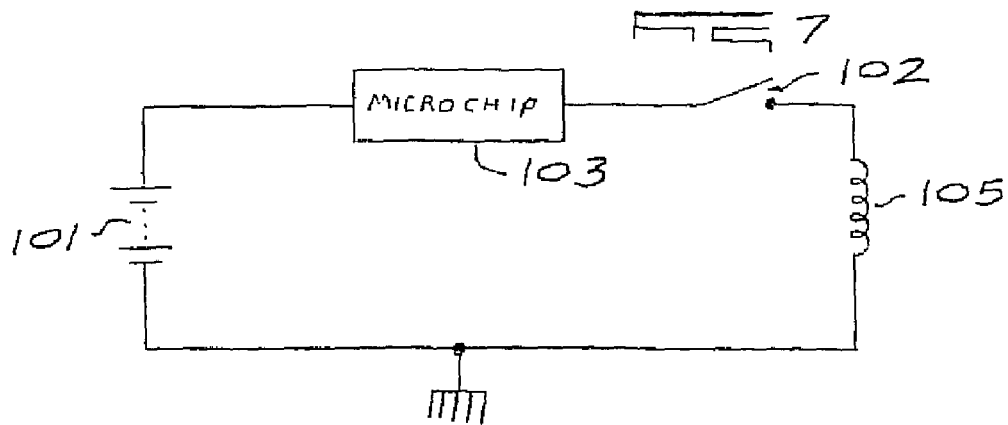
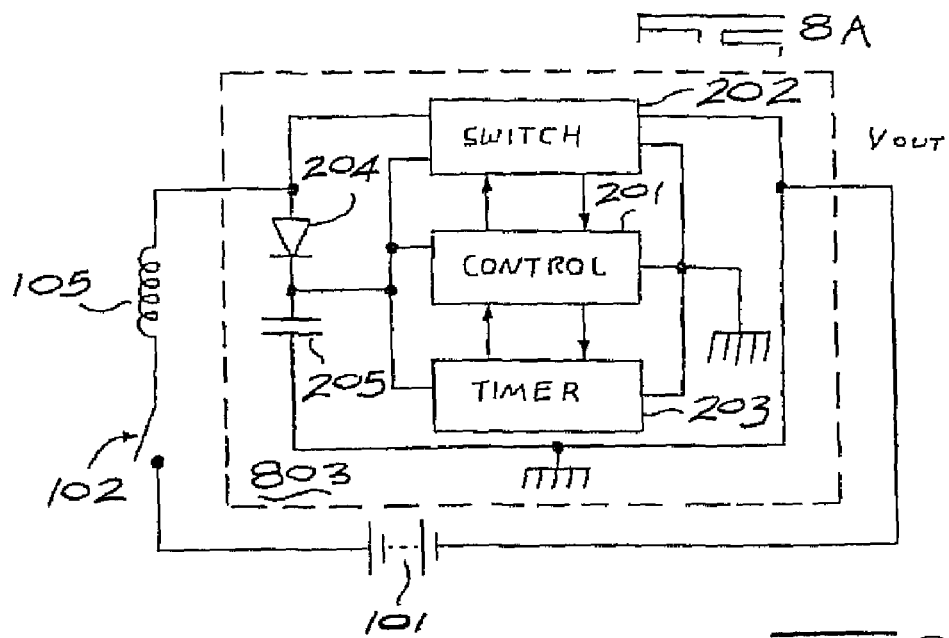
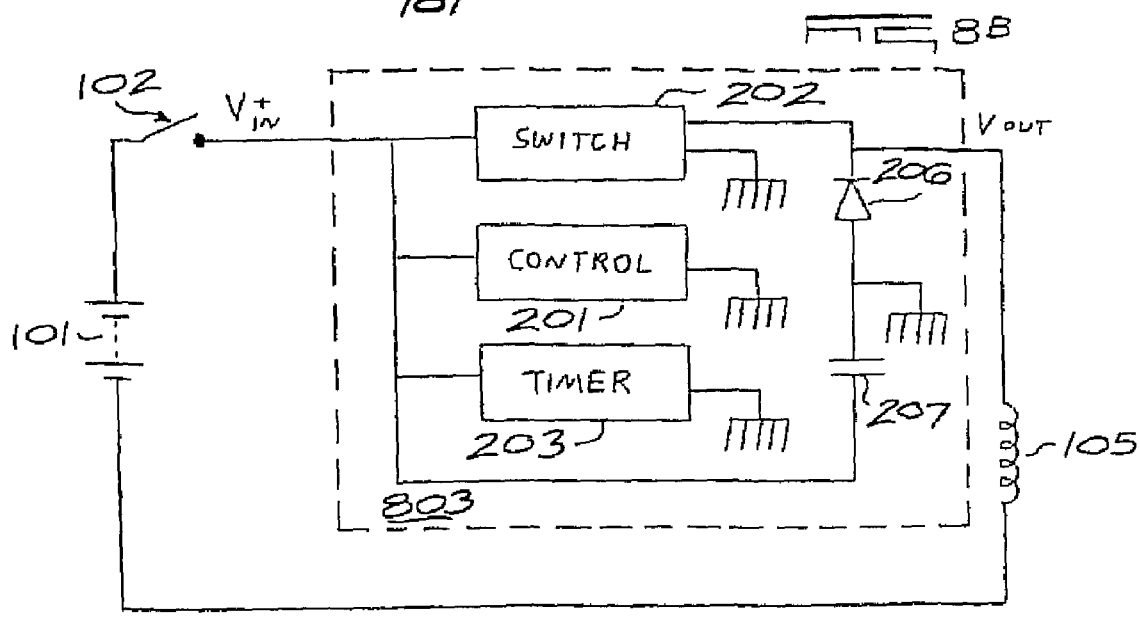

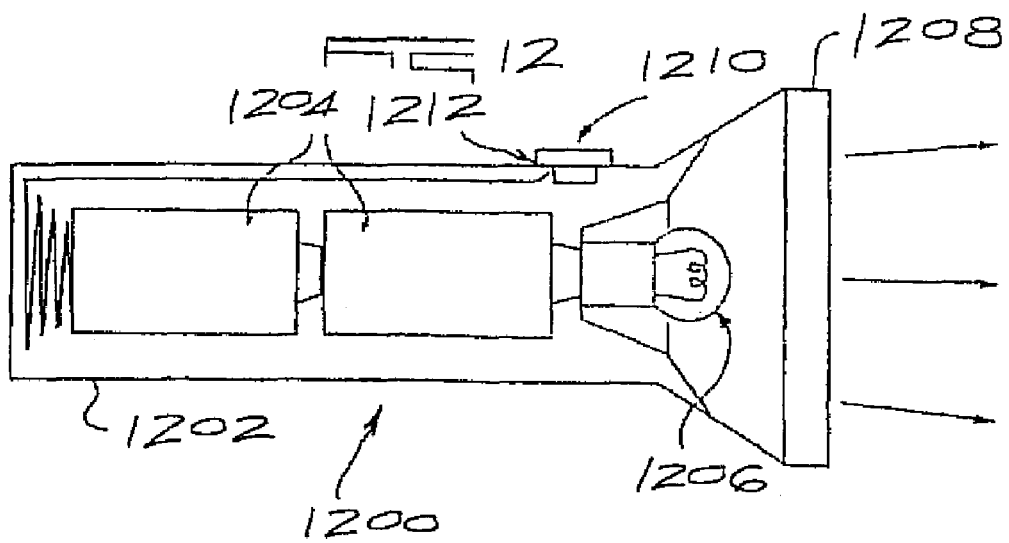
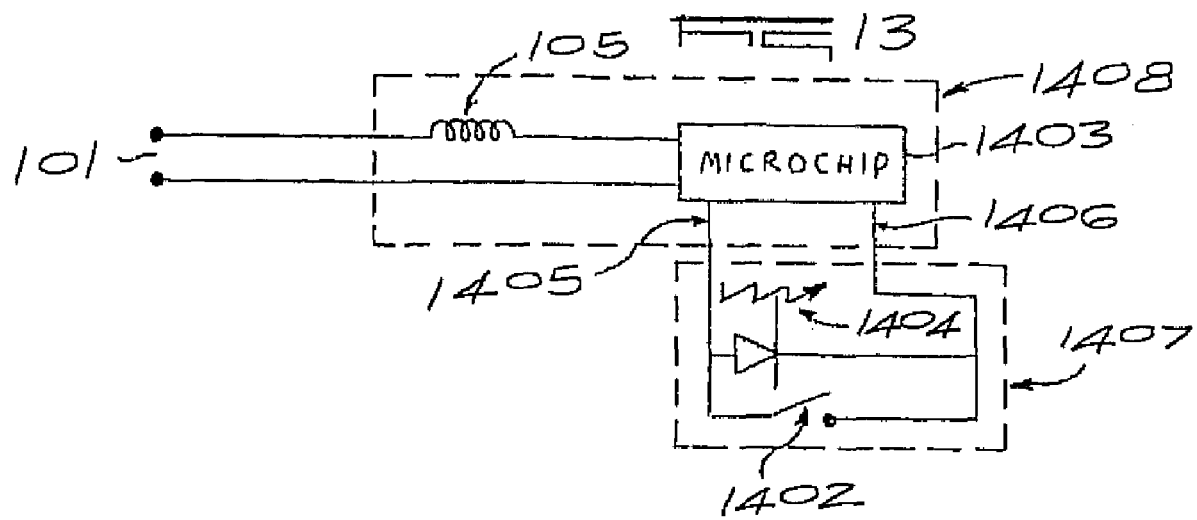
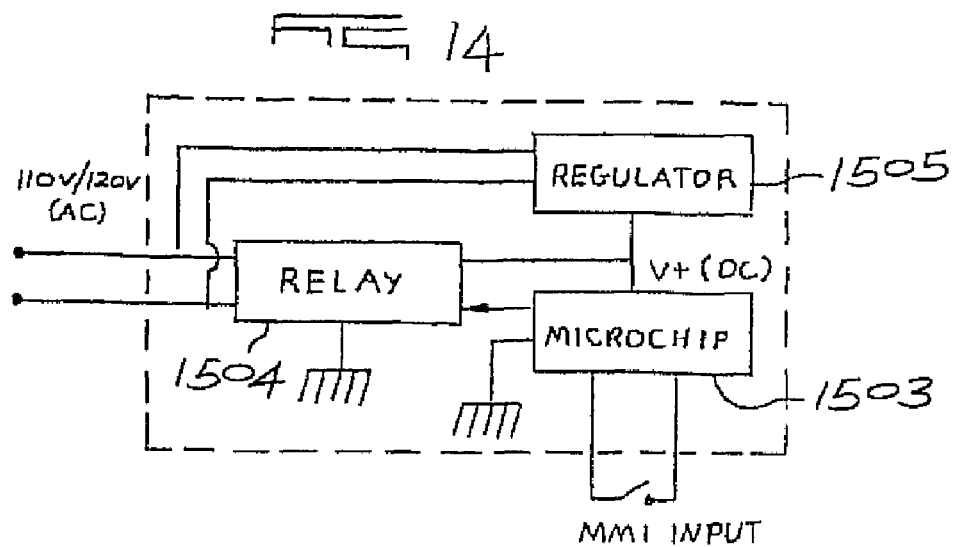

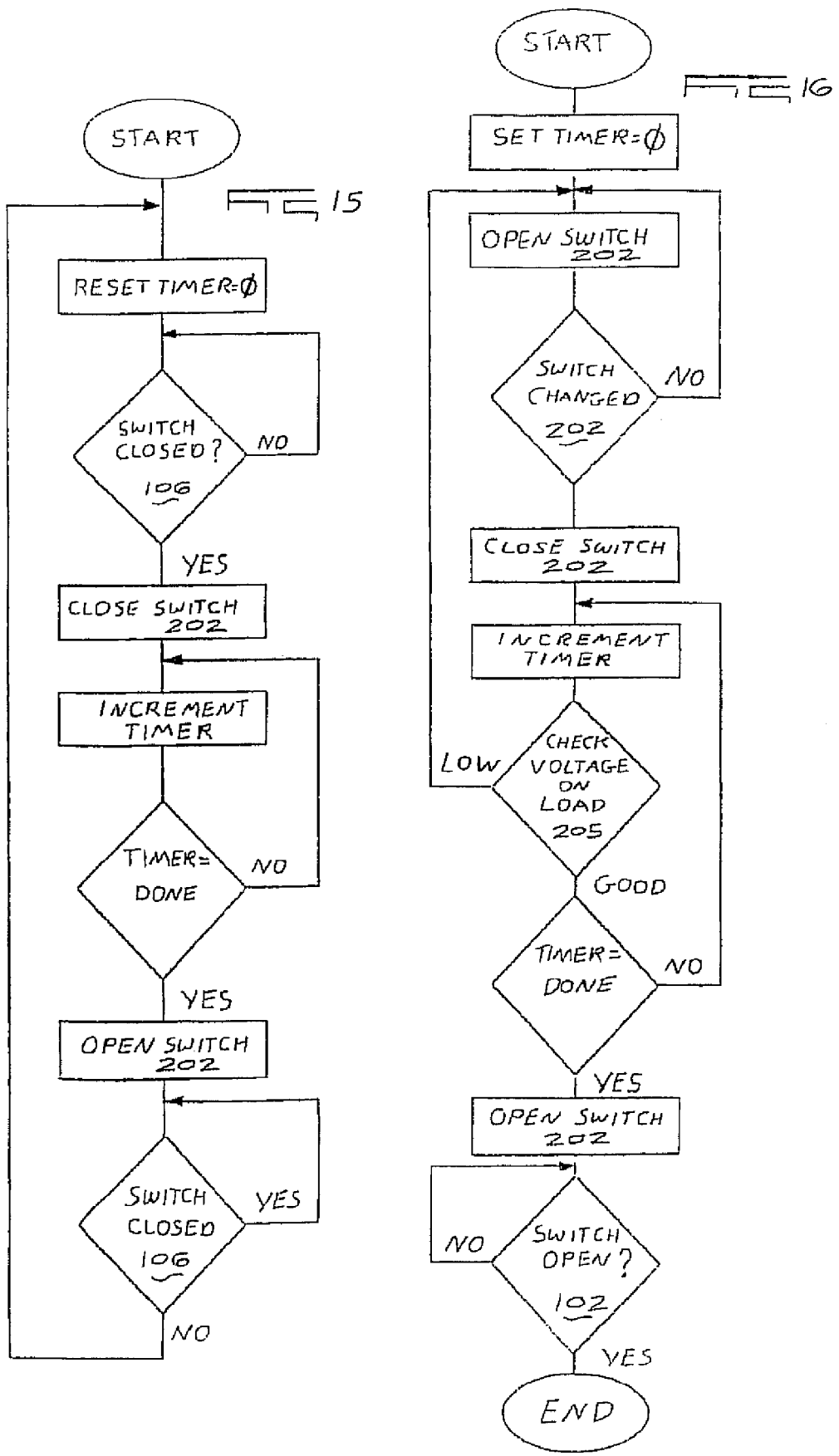

* Select modes with EMS

FIG. X

DUAL REFERENCE CAPACITIVE SENSING USER INTERFACE

CROSS REFERENCE TO RELATED APPLICATIONS

This application is a Continuation under 35 USC 120 of U.S. application Ser. No. 12/335,474, filed Dec. 15, 2008 and issuing Jul. 13, 2010 as U.S. Pat. No. 7,755,219, which is a Continuation under 35 USC 120 of U.S. application Ser. No. 11/406,491, filed Apr. 19, 2006, now U.S. Pat. No. 7,466,040.

FIELD OF THE INVENTION

The present invention relates to new intelligent electrical current switching devices and more particularly, to microchip controlled electrical current switching devices. The invention further relates, in one embodiment, to intelligent batteries having embedded therein a microchip for use with a variety of electrical devices to add heretofore unknown functionality to existing electrical devices. The invention also relates, according to another embodiment, to intelligent hand-held electronic devices, and in a preferred embodiment to hand-held light sources, and more particularly, to flashlights. According to one embodiment of the present invention, the invention relates to intelligent hand-held flashlights having microchip controlled switches wherein said switches can be programmed to perform a variety of functions including, for example, turning the flashlight off after a pre-determined time interval, blinking, or dimming, etc. According to a still further embodiment, the invention relates to low current switches controlled by microchips of the present invention for use in building lighting systems.

BACKGROUND OF THE INVENTION

In conventional flashlights, manually-operated mechanical switches function to turn the flashlight "on" and "off." When turned "on," battery power is applied through the closed switch to a light bulb; the amount of power then consumed depends on how long the switch is closed. In the typical flashlight, the effective life of the battery is only a few hours at most. Should the operator, after using the flashlight to find his/her way in the dark or for any other purpose, then fail to turn it off, the batteries will, in a very short time, become exhausted. Should the flashlight be left in a turned-on and exhausted condition for a prolonged period, the batteries may then leak and exude corrosive electrolyte that is damaging to the contact which engages the battery terminal as well as the casing of the flashlight.

When the flashlight is designed for use by a young child the likelihood is greater that the flashlight will be mishandled, because a young child is prone to be careless and forgets to turn the flashlight "off" after it has served its purpose. Because of this, a flashlight may be left "on" for days, if not weeks, and as a result of internal corrosion may no longer be in working order when the exhausted batteries are replaced.

Flashlights designed for young children are sometimes in a lantern format, with a casing made of strong plastic material that is virtually unbreakable, the light bulb being mounted within a reflector at the front end of the casing and being covered by a lens from which a light beam is projected. A U-shaped handle is attached to the upper end of the casing, with mechanical on-off slide switch being mounted on the handle, so that a child grasping the handle can readily manipulate the slide actuator with his/her thumb.

With a switch of this type on top of a flashlight handle, when the slide actuator is pushed forward by the thumb, the switch "mechanically" closes the circuit and the flashlight is turned "on" and remains "on" until the slide actuator is pulled back to the "off" position and the circuit is opened. It is this type of switch in the hands of a child that is most likely to be inadvertently left "on."

To avoid this problem, many flashlights include, in addition to a slide switch, a push button switch which keeps the flashlight turned on only when finger pressure is applied to the push button. It is difficult for a young child who wishes, say to illuminate a dark corner in the basement of his home for about 30 seconds, to keep a push button depressed for this period. It is therefore more likely that the child will actuate the slide switch to its permanently-on position, for this requires only a monetary finger motion.

It is known to provide a flashlight with a delayed action switch which automatically turns off after a pre-determined interval. The Mallory U.S. Pat. No. 3,535,282 discloses a flashlight that is automatically turned off by a delayed action mechanical switch assembly that includes a compression spring housed in a bellows having a leaky valve, so that when a switch is turned on manually, this action serves to mechanically compress the bellows which after a pre-determined interval acts to turn off the switch.

A similar delayed action is obtained in a flashlight for children marketed by Playskool Company, this delayed action being realized by a resistance-capacitance timing network which applies a bias to a solid-state transistor switch after 30 seconds or so to cut off the transistor and shut off the flashlight. Also included in the prior art, is a flashlight previously sold by Fisher-Price using an electronic timing circuit to simply turn off the flashlight after about 20 minutes.

It is also known, e.g. as disclosed in U.S. Pat. No. 4,875,147, to provide a mechanical switch assembly for a flashlight which includes a suction cup as a delayed action element whereby the flashlight, when momentarily actuated by an operator, functions to connect a battery power supply to a light bulb, and which maintains this connection for a pre-determined interval determined by the memory characteristics of the suction cup, after which the connection is automatically broken.

U.S. Pat. No. 5,138,538 discloses a flashlight having the usual components of a battery, and on-off mechanical switch, a bulb, and a hand-held housing, to which there is added a timing means and a circuit-breaking means responsive to the timing means for cutting off the flow of current to the bulb, which further has a by-pass means, preferably child-proof, to direct electric current to the light bulb regardless of the state of the timing means. The patent also provides for the operation of the device may be further enhanced by making the by-pass means a mechanical switch connected so as to leave it in series with the mechanical on-off switch. Furthermore, the patent discloses a lock or other "child-proofing" mechanism may be provided to ensure that the by-pass is disabled when the flashlight is switched off.

Most conventional flashlights, like those described above, are actuated by mechanical push or slide button-type switches requiring, of course, mechanical implementation by an operator. Over time, the switch suffers "wear and tear" which impairs operation of the flashlight as a result of, for example, repeated activations by the operator and/or due to the fact that the switch has been left "on" for a prolonged period of time. In addition, such mechanical switches are vulnerable to the effects of corrosion and oxidation and can cause said switches to deteriorate and to become non-functioning. In addition, these prior art devices having these mechanical switches are generally "dumb," i.e. they do not provide the user with convenient, reliable, and affordable functionalities which today's consumers now demand and expect.

Another type of switch is a touch-sensor switch which responds to (senses) the touch of a non-conductive material such as glass or plastic. It is also possible to use this technology to sense proximity.

The prior art switches typically provide two basic functions in prior art flashlights. Firstly, the mechanical switches act as actual conductors for completing power circuits and providing current during operation of the devices. Depending upon the type of bulb and wiring employed, the intensity of electrical current which must be conducted by the switch is generally quite high leading to, after prolonged use, failure. Secondly, a mechanical switch must function as an interface between the device and its operator, i.e. a man-machine-interface ("MMI") and necessarily requires repeated mechanical activations. Over time the switch mechanically deteriorates.

Also, currently the electrical switches used in buildings/houses for control of lighting systems are of the conventional type of switches which must conduct, i.e. close the circuit, upon command, thus also providing the MMI. These prior art switches suffer from the same disadvantages as the switches described above in relation to portable electronic devices, like flashlights. Moreover, the switches are relatively dumb in most cases and do not provide the user with a variety of functions, e.g. but not limited to timing means to enable a user, for example, a shop owner or home owner to designate a predetermined shut off or turn on point in time.

There is a need for inexpensive, reliable, and simple intelligent electronic devices which provide increased functionality and energy conservation.

SUMMARY OF THE INVENTION

According to one embodiment of the present invention, there is provided a microchip controlled switch to manage both the current conducting functions and the MMI functions in an electronic device, such as a flashlight, on a low current basis i.e. without the MMI device having to conduct or switch high current. According to one aspect of the invention, the MMI functions are controlled by very low current signals, using touch pads, or carbon coated membrane type switches. These low current signal switches of the present invention can be smaller, more reliable, less costly, easier to seal and less vulnerable to the effects of corrosion and oxidation. Moreover, since the switch is a solid state component, it is, according to the present invention, possible to control the functions of the device in an intelligent manner by the same microchip which provides the MMI functions. Thus, by practicing the teachings of the present invention, more reliable, intelligent, and efficient electrical devices can be obtained which are cheaper and easier to manufacture than prior art devices.

According to a further embodiment, the invention provides a power saving microchip which, when operatively associated with an electronic device, will adjust the average electric current through a current switch, provide an on and off sequence which, for example, but not limited to, in the case of a flashlight, can be determined by an operator and may represent either a flash code sequence or a simple on/off oscillation, provide an indication of battery strength, and/or provide a gradual oscillating current flow to lengthen the life of the operating switch and the power source.

According to one embodiment of the invention, an intelligent flashlight, having a microchip controlled switch is provided comprising a microchip for controlling the on/off function and at least one other function of the flashlight. According to a further embodiment of the invention, an intelligent flashlight having a microchip controlled switch is provided comprising an input means for sending activating/deactivating signals to the microchip, and a microchip for controlling the on/off function and at least one other function of the flashlight. According to a further embodiment of the invention, there is provided an intelligent flashlight having a microchip controlled switch comprising an input means for selecting one function of the flashlight, a microchip for controlling at least the on/off function and one other function of the flashlight, wherein the microchip control circuit may further comprise a control-reset means, a clock means, a current switch, and/or any one or combination of the same.

According to another embodiment of the invention, there is provided a portable microchip device for use in serial connection with a power source, e.g. an exhaustible power source, and an electronic device powered by said source wherein said electronic device has an input means for activating and deactivating said power source, and said microchip comprising a means for controlling the on/off function and at least one other function of the electronic device upon receipt of a signal from said input means through said power source.

According to a still further embodiment of the invention, there is provided a microchip adapted to control lighting in buildings. According to this embodiment, the normal switch on the wall that currently functions as both a power-switch, i.e. conduction of electricity, and MMI can be eliminated, thus eliminating the normal high voltage and high current dangerous wiring to the switch and from the switch to the load or light. Utilizing the present invention, these switches can be replaced with connecting means suitable for low current DC requirements.

According to another embodiment, the present invention is directed to a battery comprising an energy storage section, a processor, e.g. a microchip and first and second terminal ends. The first terminal end being connected to the energy storage section, the second terminal end being connected to the processor, and the processor being connected to the second terminal end and the energy storage section. The processor controls the connection of the second terminal end to the energy storage section.

According to another embodiment, the present invention provides an electronic apparatus which includes an electrical device, comprising a power supply, an activating/deactivating means, and a processor. The activating/deactivating means is connected to the processor and the processor is connected to the power supply. The processor controls the on/off function of the device and at least one other function of the device in response to signals received from the activation/deactivation means.

The present invention, according to a still further embodiment, provides a flashlight comprising a light source, an energy storage means, a switch means, and a processor means. The switch means being in communication with the processor means and the processor means being in communication with the energy storage means which is ultimately in communication with the light source. The processor controls the activation/deactivation of the light source and, in some embodiments, further functions of the flashlight, in response to signals received from the switch means.

The invention also extends to a module for selecting at least one function of an energy consuming load of a product which is connectable to a power source, the module including a microchip, at least one first switch which is connected to the microchip which is selected from an electromechanical switch and a resistance type switch, and a proximity/touch sensor, and wherein the first switch and the proximity/touch sensor form a user interface to select functions of the load.

The module being configured according to at least one of the following configurations:
  a) wherein the microchip selectively controls a locating signal or a find in the dark indicator in response to a signal from the user interface, the selection of the locating signal or find in the dark indicator being based on the current state of the product;
  b) wherein the user interface is used to detect a condition in which the product, with the load activated, is released from a hand and the microchip, in response to such detection, suspends activation of the load until the product is again handled; and
  c) wherein the user interface establishes a reference value during a condition of the product being handled, and the microchip uses the reference value to determine when the product is released from a hand.

A module of this kind thus uses multiple types of switches, including an electromechanical switch (EMS), to activate an electric or electronic apparatus. This switch may be latching or non-latching and include a resistive carbon coated type switch. Once the product (apparatus) is switched on, mode/function selections of a single load may be possible. Selection between different loads may also be made. The same switch use for activation may also be used to de-activate the product.

The apparatus is also capable of sensing or detecting touch and/or proximity as per disclosures in the art. This proximity sensing/touch sensing or detecting may initially be inactive i.e. before the product is activated through the electromechanical switch (EMS). In this case the proximity touch sensor cannot switch the apparatus "ON" from an "OFF" state.

In case of an activated handheld product (e.g. a hairdryer, toothbrush, heat gun, etc.) the product may be switched to a sleep mode when put down. Once put down and switched to sleep (the load is turned off), a timer is activated and if the apparatus is picked up again within a certain predefined (or user defined) period, the apparatus is switched "ON" again. It is preferably, but not exclusively, switched "ON" in the mode in which it was before it switched to sleep. This "sleeping" and "ON" switching results from signals generated by the proximity/touch sensing structure.

If more than the defined period elapses before the apparatus is touched again, the apparatus switches "OFF" and all further actions are suspended until an activation resulting from an EMS occurs.

In some embodiments an indication is given to warn the user of imminent switch off.

Once switched "OFF" the proximity/touch sensor switch (TSS) cannot activate the apparatus and an EMS operation would be required to switch the product on.

The aforegoing method has several advantages over the prior art. Since an EMS operation is required to switch "ON", the activation of an apparatus can be made as easy, or as secure against inadvertent activations, as any product with only an EMS type interface. In fact, a threshold may be set for the TSS to prevent activation through the EMS if one or more criteria on the TSS are not met. Such a threshold may be a hard-coated or predetermined value but it may also be a value that is built up over time and stored in non-volatile memory. This may prevent accidental activation, for example when the product is in a travel bag, i.e. when the product is not held.

Furthermore, the TSS need not operate when the apparatus is "OFF". This reduces current consumption. An example may be a hairdryer. The user would pick it up and switch the dryer on at a desired level. As is sometimes the case, the user may need both hands for other tasks and would put the hairdryer down which would then immediately and automatically switch off. If picked up again within a predetermined period (say for example 5 minutes) the dryer would automatically switch on at the setting previously selected.

This type of interaction between the EMS and TSS switches, combined with the time periods between actuations, the time period or periods of actuations, and the number of actuations, forms a basis for selecting a specific function or performing an action.

It may also be possible to use the EMS to select "OFF".

A further example may be switching a toy on using an EMS interface. The toy would stay activated for as long as the proximity touch sensor switch senses touch, or possibly, intermittent touch (or even proximity) action. As such, a child would activate a toy or even a flashlight and the product would stay active for as long as it is held or played with but would switch "OFF" when "released", or at least switch "OFF" automatically after a defined delay period. This would save energy and is of special importance in battery operated products.

In another embodiment a product may be activated and used. Upon deactivation it may (continue to) display status information such as remaining battery power/fuel until the device is released (when no further touch or proximity is detected). Such display may also continue for a short while after such release and start again when the product is picked up again. This may be a function that is always available or only within a certain period after the product, having been activated, is put down.

It is important to note that the operation of the proximity/touch sensor switch (TSS) may be substantially different or in fact opposite in certain ways when compared to normal touch sensor or proximity sensing implementations as presented in the art.

The normal state of a typical TSS can be considered as being without a touch. This touch happens only infrequently when a function is selected. This corresponds closely with the operation or state of a typical switch. The time of switch actuation is in fact very short in the lifetime of the switch.

As such, in a capacitive sensing switch implementation, it is normal to create a reference value during the time of no proximity/no touch. This is, as discussed, the most common state and also the most stable state.

However, in this invention, it is proposed that for the purpose of monitoring touch, and specifically for deactivating a function when a hand-held product is put down, it is beneficial to base the reference level on the state when touch occurs.

It can be reasoned that when the product is switched "ON" through the EMS interface it is already held in a hand. (A minimum level may be set to prevent activation when not held). The operation is to continue for as long as the product is handled or not put down. As such, the important parameter here is set during the time the device is held. It can be viewed as an exceptional or unlikely situation for a hair dryer to have its switch activated and nobody touching it. As there is nothing to prevent this unlikely activation in a normal hairdryer (for example), it is not seen as a major negative if it is not prevented here. This event can however be prevented if a sensible reference level can be established and stored. However, the major advantage is the detection of "no-touch" i.e. such as when a device is activated in a normal manner, and a reference level is established while the device is being actively used and thereafter is put down. Several options exist in terms of action once a "no-touch condition" (NTC) is determined. An immediate shut down can be done, a count down to shut down may be started, a sleep mode may be entered, a warning may be given (audible, visible, vibrating), or temporary suspension of all or some functions can take place.

When a touch condition (TC) is detected again, several options again are possible, for example, but not limited to: reactivating suspended functions, giving a warning before activating functions, or activating a sequence of different functions.

Once a NTC is detected from an active operating condition the load may be deactivated and a timer may be started. Once a predetermined period/count is reached, a total shut-off is performed and further sensing for touch or proximity is suspended. In this case an EMS operation is required for activation. Such action would reduce energy consumption. In a variation of this, the sensing would enter a low power operating mode.

During the time period immediately after activation with the EMS interface, a fast filter routine may be performed to quickly establish a reference level of the touch sensor/proximity sensor interface.

Once this short period has passed (say a second for typical toothbrush/hairdryer type hand-held applications) it is assumed that the level has settled and the filter coefficients may be changed to give a slower response to change. Once a decision is made that a NTC exists, the adaptation of the reference level may be halted. It will only be resumed once a TC is determined or when an activation occurs through the EMS interface.

While the present invention is primarily described in this application with respect to either a flashlight or a lighting application, the embodiments discussed herein should not be considered limitative of the invention, and many other variations of the use of the intelligent devices of the present invention will be obvious to one of ordinary skill in the art, particularly in respect of electric motor applications in, for example, hairdryers and toothbrushes.

BRIEF DESCRIPTION OF THE DRAWINGS

FIG. 7 is a schematic of a battery having embedded therein a microchip according to a further embodiment of the invention;

FIG. 8A is a block diagram of a microchip for use in a battery according to one embodiment of the present invention;

FIG. 8B is a block diagram of a second type of microchip for use in a battery according to another embodiment of the present invention;

FIG. 12 is a schematic of a flashlight having therein a microchip controlled switch according to one embodiment of the present invention;

FIG. 13 is a schematic of one embodiment of the present invention of a low current switching device suitable for lighting systems in buildings;

FIG. 14 is a block diagram of one embodiment of the present invention, i.e. microchip 1403 of FIG. 13;

FIG. 15 is a flow diagram for a microchip as shown in FIGS. 4 and 5 for a delayed shut off function in an embodiment of the present invention;

FIG. 16 is a flow diagram for a microchip as shown in FIGS. 7 and 8A for a delayed shut off function in an embodiment of the present invention;

DETAILED DESCRIPTION OF THE INVENTION

Figure 1:
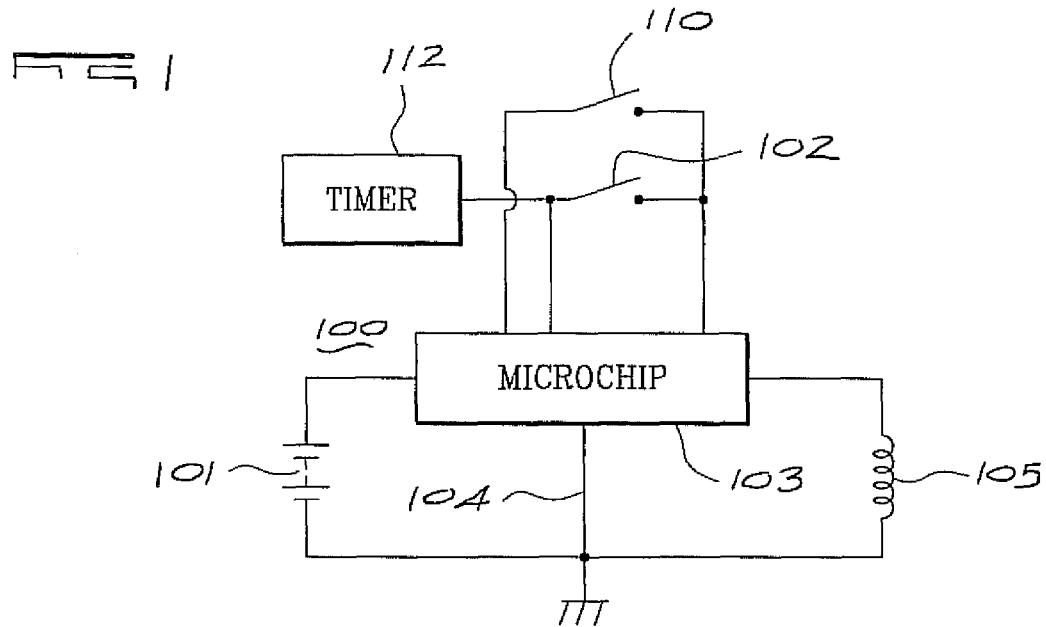
FIG. 1 is a schematic of a device having a microchip controlled push button or sliding type input activation/deactivation switch according to one embodiment of the present invention.

According to one embodiment or aspect of the present invention, and referring to FIG. 1, a schematic depiction of a main circuit 100 of an electronic device, for example, a flashlight, is provided, wherein the device has a microchip 103 and a microchip controlled input activator/deactivator 102, for example, a push button or sliding switch. The main circuit 100 of the device is powered by current supplied by a power source 101 which may be any power source, e.g. a DC battery, as is well known to those of ordinary skill in the art. While the following discussion is limited to specific electronic devices, that is flashlights, it is to be understood that the description is equally applicable to other electronic devices including portable radios, toys, for example but not limited to battery operated cars, boats, planes, and/or other electrically powered toys, and motors of devices such as hairdryers and toothbrushes.

Referring to FIG. 1, when an operator activates the input push button or sliding command switch 102 to the "on" position, the microchip 103 receives a signal. The switch 102 is a direct electrical input to the microchip 103. The microchip 103 is grounded by grounding means 104 and is in series between the power source 101 and a load 105. The microchip 103 also controls the transfer of sufficient power by means of a current switch (not shown in FIG. 1) to the load 105 which can be, for example, a resistor-type bulb in the case of a flashlight to provide illumination.

The microchip 103, and other microchips of the present invention, can have its/their intelligence embedded in combinational or sequential logic, a PLA or ROM type structure feeding into a state machine or a true microcontroller type structure. The memory for the above will normally be non-volatile, but should there be a need for selectable options, EE or flash memory structures may be used.

In any of the various examples of the invention the microchip and switches and other devices connected thereto can preferably be located in a compact housing or module designed to facilitate connections between the load in question and the power source and configured so that the module can easily and effectively be incorporated in a product which contains the load.

Figure 2:
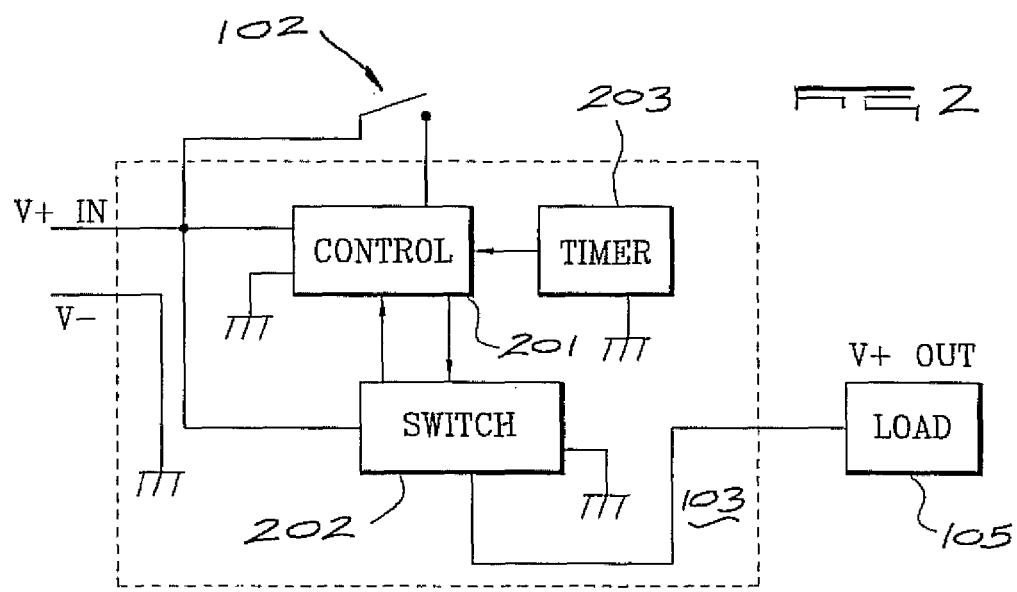
FIG. 2 is a block diagram of a microchip for use with a push button or sliding input activation/deactivation switch according to one embodiment of the invention.

The structure and operational parameters of such a microchip 103 are explained in greater detail with respect to FIG. 2. As shown in FIG. 1, power is supplied to the microchip 103 by the power source 101. When an operator activates the input switch 102 to the "on" position it represents a command which is communicated to the microchip 103. The input means 102 requires very low current in preferred embodiments. In the FIG. 2 embodiment of the invention, microchip control/reset means 201 simply allows a current switch 202 to pass current from the power source 101 to the load 105 in an unimpeded manner when the MMI switch 102 is activated, and, in the case of a flashlight, illumination is obtained. It is important to recognize, however, that it is the control circuit 201 which activates the current switch 202, acting on an input from the MMI switch 102. Unlike heretofore known prior art devices, the activating switch 102 does not conduct current to the load 105, but is only a command input mechanism which can, according to the invention, operate on very low current. For example, according to the invention, touch sensor input or carbon coated membrane type switch devices are preferred.

If, for example, an emergency notification function is desired, the flashlight may be designed to alternately flash on and off every second. First, the operator activates the input 102 into the appropriate position to indicate such a function is desired. During the "on" segment of the flashing routine, the control/reset means 201 commands the current switch 202 to close and let current flow through to the load 105 thereby causing, in the case of a flashlight, the bulb to illuminate. Simultaneously, the control/reset means 201 uses timing means 203 as a clock for timing. After the control/reset means 201 determines one second has elapsed, the control/reset means 201 instructs the current switch 202 to open and interrupt the current flow to the load 105, and bulb illumination is discontinued. It is important to note that both the control/reset means 201 and current switch 202 are still active and fully powered; however, current delivery is now latent with respect to the load 105. When another second has elapsed, a command is passed from the control/reset means 201 which again allows current to be delivered through the current switch 202 to the load 105, and, in the case of a flashlight, bulb illumination is immediately resumed. The device continues an alternating current delivery routine until either the operator switches the setting of the activating input switch 102 to the "off" position, or until the conditions pre-programmed into the microchip, e.g. into the control/reset means 201, are satisfied and current delivery is permanently discontinued.

Similar operating routines can be employed to generate other conspicuous flashing functions such as the generation of the universal distress signal S.O.S. in Morse code. Again, such a function would require that the microchip, e.g. the control/reset means 201, be pre-programmed with the appropriate code for creating such a signal, and to permit current transmission from the switch 202 to the load 105 in accordance with the code with the assistance of the timing means 203. For example, it may be desirable to have an S.O.S. sequence wherein flashes representing each individual letter are separated by time intervals ranging from one-half (½) second to one (1) full second, while the interval between each letter in the code comprises two (2) full seconds. After a certain number of repetitions of the routine, again determined by the operator or as pre-programmed within the microchip, e.g. within the control/reset means 201, the signal is discontinued.

Figure 3:
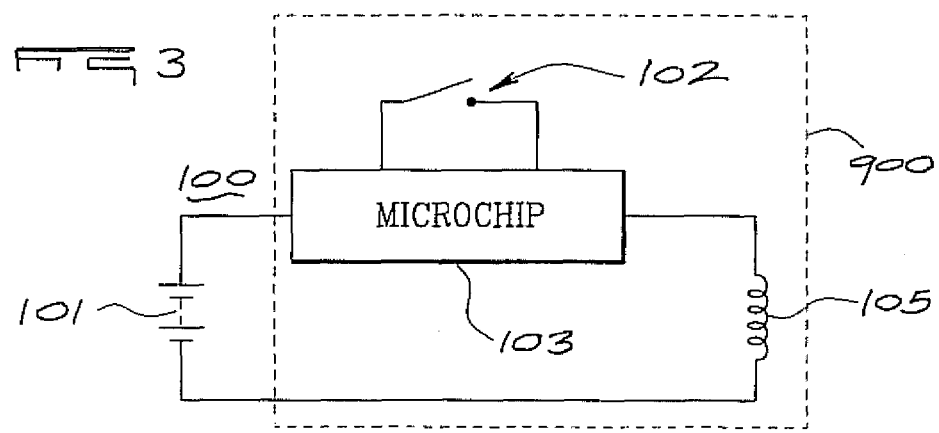
FIG. 3 is a schematic of a second type of intelligent device having a microchip controlled push button or sliding type input activation/deactivation switch according to another embodiment of the invention.

As shown in FIG. 3, it is possible to remove the grounding means 104 from the main circuit 100. However, it is then necessary to intermittently provide an alternative power source for the microchip 103 and to create a virtual ground reference level. A suitable microchip 103 for this configuration is described in greater detail with respect to FIGS. 8A and 8B.

Figure 4:
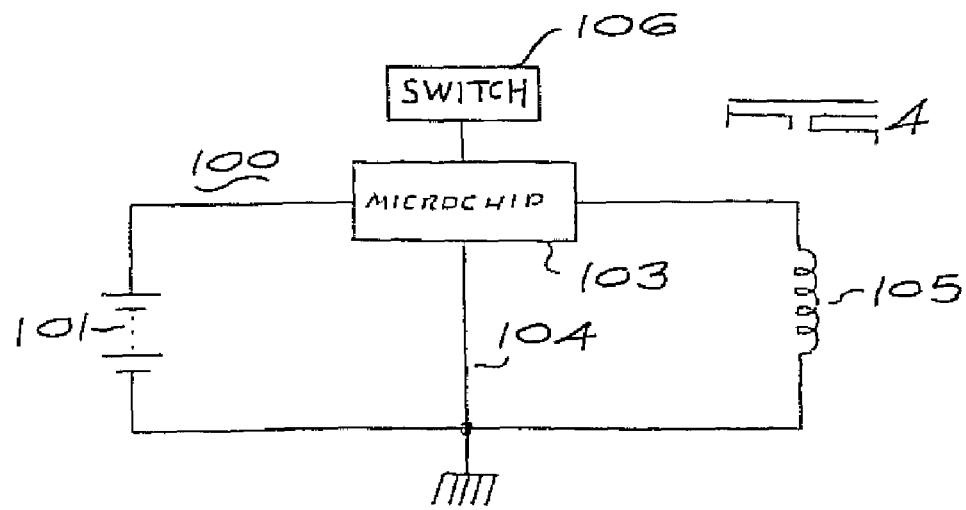
FIG. 4 is a schematic of a device having a microchip controlled touch pad or carbon coated membrane activation/deactivation switch according to a further embodiment of the invention.

Referring to FIG. 4, when utilizing the circuits in the microchip of some embodiments of the present invention, carbon coated membrane or touch pad type switches 106 are preferred. Carbon coated membrane switches and touch pad switches have many advantages over conventional high current switches, such as those currently used in flashlights. According to the present invention, carbon coated membrane type switches, low current type switches, and touch pad type switches can be used which may be smaller, less costly, easier to seal, and less vulnerable to corrosion and oxidation than conventional switches which also transfer energy or current to the load. Moreover, according to one embodiment of the present invention, carbon coated membrane type switches, touch pad switches, or low current type switches can be formed structurally integral with the product or its housing, for example with the casing of a flashlight.

A block diagram showing the microchip 103 for use, in accordance with one embodiment of the present invention, with a carbon coated membrane, a touch pad switch, or a low current type switch 106 is now explained in greater detail with reference to FIG. 5. The current switch 202 is powered directly by the grounded power source 101. However, output of current from the current switch 202 to the load 105 is dependent on the control/reset means 201. When an operator depresses the touch pad switch 106, carbon coated membrane switch 106 or low current type switch 106, the control/reset means 201 allows the current switch 202 to pass current to the load 105. However, in more intelligent applications, the control/reset means 201 will coordinate, based on the clock and/or timing means 203, to execute timing routines such as, but not limited to, intermittent flashing, the flashing of a conspicuous pattern such as Morse code, dimming functions, battery maintenance, battery strength/level, etc.

Figure 5:
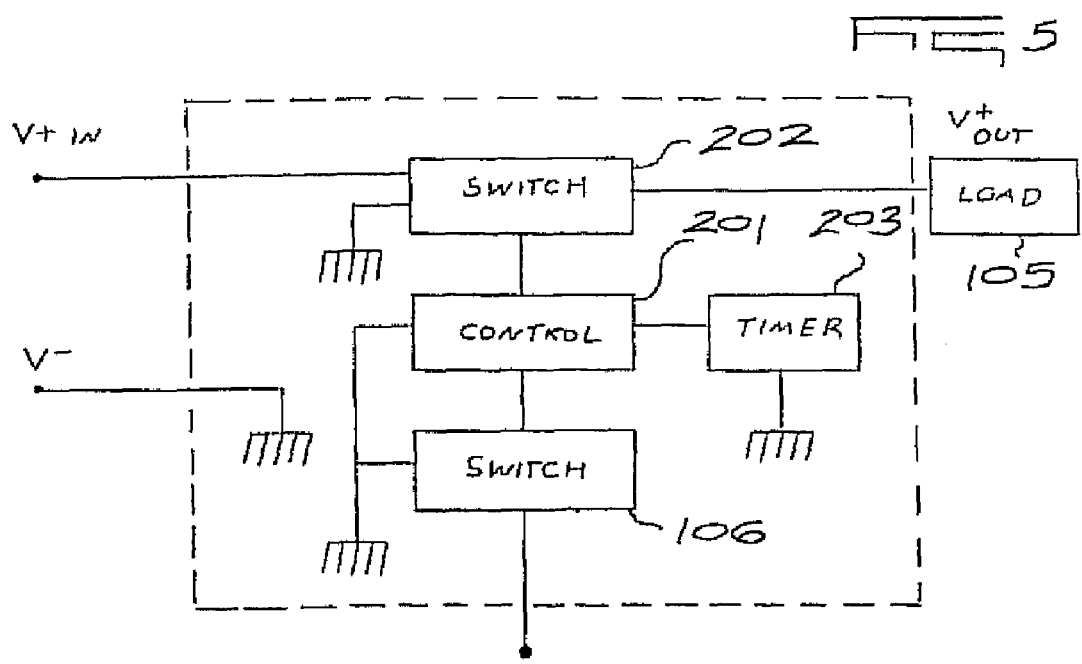
FIG. 5 is a block diagram of a microchip for use with a touch pad or carbon coated membrane activation/deactivation switch according to one embodiment of the invention.

FIG. 15 is a flow diagram for a microchip 103 as shown in FIGS. 4 and 5 and provides a delayed shutoff function. The flow sequence commences at START when the power source 101 is connected to the microchip 103, as shown in FIG. 4. The sequence of operation is substantially self-explanatory and is not further elaborated herein.

Figure 6:
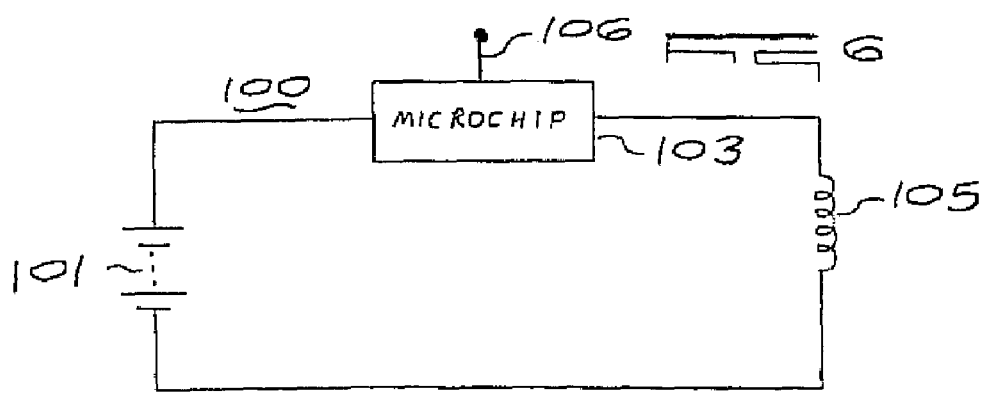
FIG. 6 is a schematic of a second type of device having a microchip controlled touch pad or carbon coated membrane activation/deactivation switch according to one embodiment of the invention.

As shown in FIG. 6, the grounding means 104 can be removed from the system as a matter of design choice. A more detailed description of a suitable microchip 103 for this type of configuration is provided with reference to FIGS. 8A and 8B.

Referring to FIG. 7, certain embodiments of the invention also provide for a battery having a microchip embedded for use with an electronic device. As shown, direct current is provided to the microchip 103 by the power source 101. When the activating input switch 102 is closed, the circuit is complete and power is transferred to the load 105 under the direction of the microchip 103. The microchip 103 can have a number of intelligent functions pre-programmed therein, such as, battery strength monitoring, recharging, adjustment of average current through a current switch, intermittent power delivery sequences, and so on. Examples of suitable microchips 103 for this type of application are discussed with reference to FIGS. 8A and 8B.

FIGS. 8A and 8B are block diagrams of two different embodiments of the present invention. A microchip 803 is especially suitable for applications wherein the microchip 803 is not grounded through the body of the electrical device or where a ground cannot otherwise be established because of design considerations. This embodiment is useful to provide sufficient operating power to the microchip and can be achieved by periodically opening and closing the current switch 202 when the activation input switch 102 is closed. For example, referring to FIG. 8A, when the input switch 102 is closed but the current switch 202 does not conduct (that is, the switch is open and does not allow current to flow to the load 105), the voltage drop over the load 105 is zero and, in the case of a flashlight, no illumination is provided from the bulb. Instead, the full voltage drop is over the current switch 202 and in parallel with a diode 204 and a capacitor 205. Once the capacitor 205 becomes fully charged, the current switch 202 can close and the circuit 103 will be powered by the capacitor 205. When circuit 803 is adequately powered, it functions in a manner identical to the circuits described previously with respect to the functions provided by the control/reset means 201 and the timing means 203.

When the charging capacitor 205 starts to become depleted, the control/reset means 201 will recognize this state and reopen the current switch 203, thus briefly prohibiting the flow of current to the load 105, in order to remove the voltage drop from the load 105 and to allow the capacitor 205 to recharge and begin a new cycle. In a flashlight application, the time period wherein current flow from the current switch 202 is discontinued can be such that the dead period of the light is not easily or not at all detectable by the human eye. In the case of a load with a high current usage, such as a flashlight, it means the ratio of the capacitance of the capacitor having to power the microchip and the current consumption of the microchip, must be such that the capacitor can power the microchip for a long time relative to the charging time (202 open). This will enable the flashlight's "off" time to be short and the "on" time to be long, thus not creating a detectable or intrusive switching of the flashlight to the user.

FIG. 16 is a flow diagram for a microchip as shown in FIGS. 7 and 8 which also provides a delayed shutoff function. The flow diagram is substantially self-explanatory and the flow sequence commences at START when closure of the switch 102 takes place from an open position.

Figure 11:
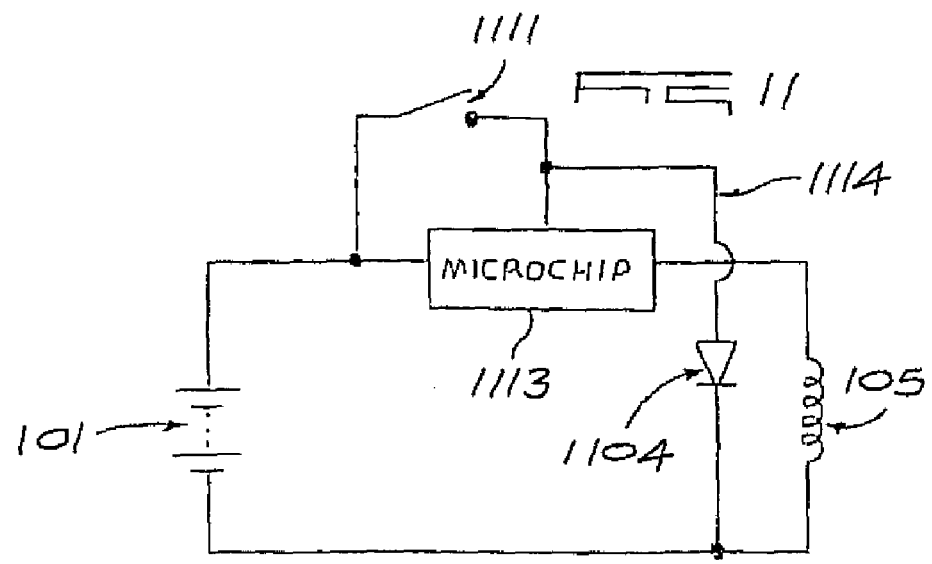
FIG. 11 is a schematic of a device having a microchip controlled switch according to one embodiment of the present invention.

According to another embodiment of the invention, e.g. in relation to another product of low current consumption, such as a FM radio, the designer may opt for a capacitive (reservoir) device externally to the microchip (see FIG. 11). In this case, the electrical device may function for a time longer than the time required for charging the capacitor (205, 207) which is when the current switch (202) is open and not conducting current.

According to another embodiment of the invention, an output may be provided to indicate a condition, e.g. a battery is in a good or bad condition. It may also be suitable to assist in locating a device, e.g. but not limited to a flashlight, in the dark. This may be a separate output pin or may be, according to another embodiment, shared with the MMI switch input, (see FIG. 11) Referring to FIG. 11, an indicator/output device 1104 may, for example, be an LED. When a microchip 1113 pulls a line 1114 to high, the LED 1104 shines. The LED 1104 may also shine when a switch 1111 is closed by a user. However, since that is only a momentary closure, this should not create a problem.

According to a further embodiment of the invention, referring to FIG. 11, the microchip 1113 can activate the LED 1104 for a short time, e.g. for 100 milliseconds, every 10 seconds. This indication will let potential users know the device is in a good state of functionality and will enable fast location of the device in the dark, e.g. in times of emergency. The low duty cycle will also prevent unnecessary battery depletion.

In an alternative embodiment of the invention, FIG. 8B illustrates the charging and discharging of a capacitor 207 to provide power to the circuit 803, wherein the diode and capacitor structure establishes a ground reference for the circuit 803.

Each of the embodiments explained with respect to FIGS. 8A and 8B is suitable for use in a manner which depends upon the particular application. Indeed, the embodiments shown in FIGS. 8A and 8B can be directly embedded into a battery and/or can be separately constructed in another portable structure or module, for example in the shape of a disc, about the size of a quarter, to be inserted at the end of the battery between the output means or positive terminal of the battery and the current receiving structure of the electronic device. As described, the embodiments shown in FIGS. 8A and 8B can be utilized with high current switches currently being utilized in simple non-intelligent electronic devices, for example flashlights, radios and toys. For example, in the case of a portable simple radio without any intelligence, an automatic shut "off" may be achieved by using the intelligent battery or portable microchip of the present invention having a timing function to automatically shut off the radio after a given period of time, e.g. after the user is asleep.

The architecture of the embodiments shown in FIGS. 8A and 8B provides certain advantages over the simple dumb architecture in current simple electrical devices, for example, flashlights. Due to the unique design of the microchips, as shown in FIGS. 8A and 8B, after a product (into which the microchip is incorporated) is shut off the microchip remains powered for an additional period of time which allows the microchip to receive additional commands. For example, a second "on" activation within a given period after a first "on" and "off" activation, may be programmed into the microchip (control/reset means) to indicate a power reduction or dimming function or any other function as desired by the designer of the device. This is accomplished, using the principles of the invention, without having to utilize substantial energy from what are typically small exhaustible power sources, e.g. DC batteries in the case of flashlights.

According to some embodiments of the present invention, more intelligent devices include many other useful functions pre-programmed within the microchip, e.g. in the control/reset means 201 and may, e.g. be assisted by a timing means 203. Referring to FIG. 2, commands can be entered through the switch 102 in several different ways. Firstly, various time sequences of closed and open activations may represent different commands. For example a single closure may instruct the microchip 103 to activate the current switch 202 continuously for a pre-determined length of time. Alternatively, two successive closures may instruct the microchip 103 to intermittently activate the current switch 202 for a pre-determined length of time and sequence, for example, a S.O.S. sequence.

Figure 9:
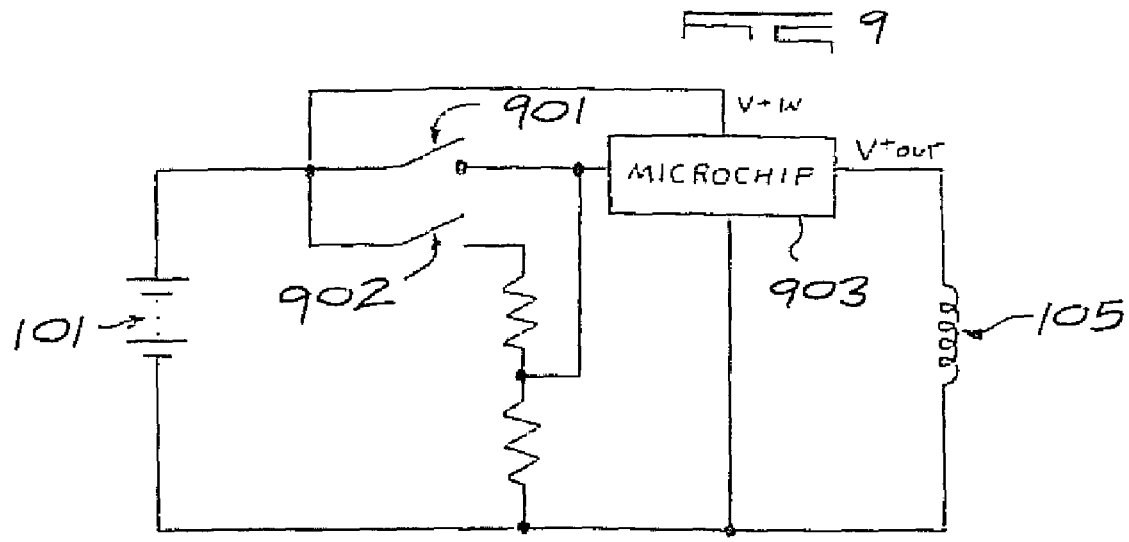
FIG. 9 is a schematic of a device having a microchip controlled switch according to one embodiment of the invention.

Secondly, referring to FIG. 9, commands may be communicated to a microchip 903 through the use of various voltages recognizable by the microchip 903 to represent various commands. For example use may be made of multiple activating switches 901 and 902 connecting different voltages to the command input structure of the microchip 903.

Figure 10:
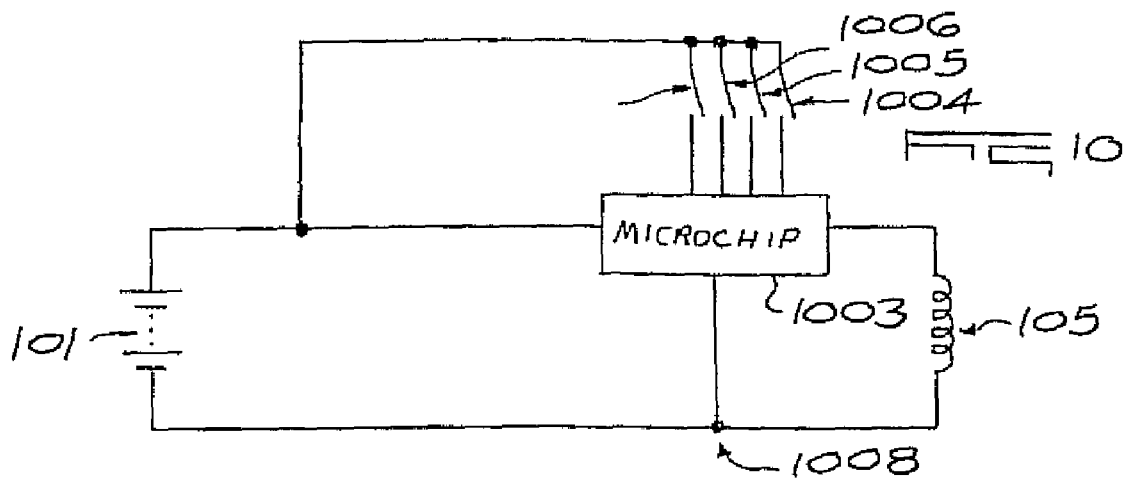
FIG. 10 is a schematic of a device having a microchip controlled switch according to one embodiment of the invention.

Thirdly, referring to FIG. 10, commands may be communicated to a microchip 1103 through the use of multiple specific switches (1004, 1005, 1006, 1007) which, when activated either singularly or in combination, are recognizable by the microchip 1103 as representing various different commands.

As can be seen in FIG. 9 (switches 901 and 902) and in FIG. 10 (switches 1004, 1005, 1006, and 1007) power or ground may be used as a command reference voltage level. For example, the switches in FIG. 10 may be connected to another ground instead of a point 1008 depending on the internal structure of the microchip.

The control/reset means included in the microchips of the present invention may and in some instances, depending upon the application, should in addition to the many possible user functions described above, include means for adjusting the average current through a switch or a means for providing a gradual "on"/"off" current flow, so that the operator does not appreciably perceive the variation (increase or decrease) in light provided by the device. These features allow for an ongoing variable level of lighting as desired by an operator, and may also lengthen the life span of the activation switch, the bulb, and the power source. Moreover, several functions can be added to an existing device, like a flashlight, through the use of a battery having embedded therein a microchip according to the present invention.

In another embodiment of the invention, the microchip is adapted to control lighting in buildings. A conventional switch on a wall that currently functions as both a power-switch and MMI can be replaced by a low current switching device such as a membrane switch, touch pad or carbon coated switching device. Since very low currents are required by the MMI switch (device) that replaces the normal wall mounted (A/C) switch, it is possible to replace the normal high voltage/current (dangerous) wiring to the switch and from the switch to the lead (light), with connectivity means suitable to the new low current DC requirements. As such, in the case of normal A/C wiring (110V/220V), the dangerous wiring can now be restricted to the roof or ceiling and all switches (MMI's) can inherently be safe. This may make the expensive and regulated safety piping (conduits) required for the wiring of electricity to wall switches redundant.

In a specific embodiment, the traditional wiring between the light and the wall switch is replaced by flexible current conducting tape that can be taped from the roof and down the wall to the required location. In another embodiment, the connections can be made by current conducting paint or similar substances. The tape or connections can be concealed by painting over with normal paint. This makes changing the location of a wall switch or the addition of another switch very easy.

The microchip of the invention can be located in the power fitting of the light. The microchip has a low current input (MMI) and a power switch to block or transfer energy to the load (light, fan, air conditioner). It reacts to inputs received to activate or disable, or control other functions, of whatever device it is controlling.

The microchip may be adapted to contain a high current/voltage switch or control an external switching device or relay. The microchip may also, as in the other embodiments discussed, have some intelligence to control functions like dimming, delayed shut off, timed activation/deactivation, timed cycles, flashing sequences and gradual on/off switching. The microchip may also be adopted, as in a specific flashlight embodiment discussed, to provide a location/emergency signal for lighting/flashing an LED.

FIG. 12 shows a flashlight 1200 with a housing 1202, batteries 1204, a bulb 1206, a reflector and lens 1208, a switch 1210 and a microchip 1212. The flashlight has a conventional appearance but its operation is based on the microchip 1212 controlling the operation of the switch 1210, as described hereinbefore.

The power input 101 in FIG. 13 may be DC (e.g. 12V) as is commonly used for some lights or AC (110V or 240V). The device 1403 may be monolithic or be a multichip unit having a relay (solid state or mechanical), a regulator (e.g.: 110 AC volt to 12V DC) and a microchip as discussed in this application.

In a specific embodiment, Ic pin 1406 can normally be high and a closure of an input means 1402, e.g. any of the low current switching devices described above, can be detected as Ic pin 1405 also goes to high. To flash an LED 1404 the microchip 1403 will reverse the polarities so that Ic pin 1405 becomes high with regards to Ic pin 1406. During this time, it may not be possible to monitor the closure of the input switch 1402 and the LED 1404 may not shine should the input 1402 be closed. In another embodiment, the microchip 1403 is able to detect closure of the input 1402 before reversing the voltage polarity as discussed and if it detects closure, it does not proceed with reversing the polarity.

In FIG. 13 reference 1407 denotes an MMI wall unit, and reference 1408 denotes a high voltage roof unit.

In FIG. 14, a microchip 1503 does not contain a current switch (e.g. switch 102) as shown in FIG. 2. However, if desired the regulator and relay can be integrated into a single monolithic microchip 1503. In the case of a 12V (DC) local voltage this may be done in any event unless the current/power considerations are too high to make it practical.

In another embodiment, the microchips 1403 and 1503 are adapted to receive commands not only via the MMI input but also over the load power (electricity) wiring. This would allow a central controller to send out various commands to various power points, controlled by a microchip according to this invention, by using address information of specific microchips or using global (to all) commands.

Referring again to FIG. 1, purely for the sake of example, the microchip 103 is activated by sliding or activating the switch 102. It is apparent that different switches can be provided for different functions of the microchip. However, in order to enhance the user-friendliness of the device, a single switch may be capable of controlling different functions of an appliance such as a flashlight to which the microchip is mounted.

Assume for the sake of example that the switch 102 is used to turn the microchip on in the sense that a flashlight is turned on. A switch 110 may then be used at any time to turn the flashlight off, by appropriately controlling operation of the microchip. This is a conventional approach to controlling operation of the microchip. As an alternative the operation of the switch 102 can be sensed by means of a timing device 112. The timing device is started when the switch 102 is closed and after a short time period, say of the order of 5 seconds or less, which is measured by the timing device, the mode or function of the switch 102 changes so that, upon further actuation of the switch 102, the switch duplicates the function of the switch 110 which can therefore be dispensed with. Thus, initially the switch 102 functions as an on-switch while, a short period after its actuation, the switch 102 functions as an off-switch. It follows that with minor modifications to the circuitry of the microchip a single switch can exhibit multi-mode capabilities with the different modes being distinguished from each other or being exhibited on a time basis or, if necessary, on any other basis.

Multi-mode capabilities can for example be incorporated in a microchip wherein the function of a switch is also linked to time. In this sense the word "function" means the action which ensues or results upon the detection of the closure or operation of the switch. For example a single switch may, from an off state of a flashlight, enable (a) the switching on of the flashlight and (b) the selection of one of a number of various modes like dimming level, flashing rate/sequence etc. when the switch is closed a number of times.

If however a certain time is allowed to pass (say five seconds) without any further closure of the switch taking place (indicating a mode has been selected), the function resulting from the next closure may be changed. Thus instead of selecting another mode, the closure may be interpreted as an "off" command.

In other words a sequence of switch closures within five seconds of each other will step the microchip through a number of predefined modes. However should at any stage a time of more than five seconds elapse between consecutive presses or closures of the switch then the next switch operation will switch the flashlight off rather than stepping the microchip to another mode.

Clearly these characteristics are not confined to the use of the chip with a flashlight for the chip can be used in other applications to vary the mode of operation thereof in a similar way. Thus, for the flashlight, the function of the switch will affect the operation of the flashlight in a manner which is dependent on the time period between successive actuations of the switch. More generally, in any electrical device which is controlled by means of the microchip, the operation of the device will be regulated by the function which is exhibited by a switch which is in communication with the microchip. The switch function in turn is dependent on the duration of a time period between successive operations of the switch.

Other modes can also be exhibited by a single switch. For example, depending on requirement, a switch can be used for on and off operation, for initiating the transmission of an emergency signal, for initiating the gradual dimming of a flashlight or the like. The scope of the invention is not limited in this regard.

In the preceding description reference has been made to a touch sensor and to a non-latching push button or latching MMI switch. These components and technologies relating thereto may be combined in certain embodiments to achieve specific operational features that may be attractive to the user in that certain comforts or user friendliness may be facilitated.

In certain embodiments the touch sensor interface/switch 106 (see FIGS. 4 and 6) that allows the user to operate and select functions may also allow the user to select or give a signal to the microchip 103 based on proximity and not necessarily physical touch or contact. This feature is an inherent characteristic of some touch sensor or touch pad technologies, for example of the types described in U.S. Pat. Nos. 5,730,165 and 6,466,036.

It is then also feasible to define a user interface that accepts both touch sensor signals as well as electromechanical switch and specifically push button switch signals. The signals may be used to select the same functions or in some embodiments the different MMI technologies may be used to select different functions or operational modes.

In a specific embodiment in accordance with the general concepts of this invention, a module comprises the energy consuming load 105 (for example a bulb, LED or other light generating element), and the microchip 103, which in accordance with principles already described controls the various functions or operational modes at least in response to signals received from the touch sensor and (traditional) switch interfaces as well as a find-in-the-dark (FITD) indication. The FITD indication may be the energy consuming load 105 or another separate element creating a visible, audible or other human detectable signal that would assist a person to locate a product containing the abovementioned elements or the MMI switch in particular, for example in the dark (referred to herein as a "locating signal").

An example, that is not to be regarded as limiting the scope of this invention, may be an interior light for passenger convenience of an automobile or other transportation vehicle such as a boat or a plane.

In one embodiment the interior (courtesy) light is interfaced with the user (MMI) via either a touch sensor and/or an electromechanical switch, such as a push-to-make (push button) type switch, hereinafter called a pb switch. The interior light can be placed in various operational modes and functions under control of the microchip 103: for example the arrangement may provide an automatic delayed shut off function; and a FITD indicator function that also gives an indication of inputs which are received via the MMI interface and which enables the selection of an operational mode based on the various activation and/or deactivation (of the MMI switch) time sequences.

In another embodiment of this example the module comprising the light generating element, the microchip 103 and the FITD indicator have at least a pb MMI as well as a touch sensor MMI. The latter may be a capacitive technology based sensor as is known in the art (see for example the disclosures in U.S. Pat. Nos. 5,730,165 and 6,466,036). This touch sensor is capable of giving an indication of, for example, a human hand being in the proximity of the sensor even if no physical contact between the sensor and the hand is made.

As an example of possible operation, the microchip 103 may use the signals received from the touch sensor indicating proximity of part of the body of the user, such as a hand, to activate the FITD indicator in a way that is different from when no proximity detection is occurring. Thus the FITD indicator that is normally off or flashing with a low duty cycle or activated in a low energy mode, may be activated in a constant on mode of a higher energy level. It is also possible in an embodiment to control the energy level, and hence the intensity of light or sound of the FITD indicator in some relationships to the proximity distance, say the closer the hand, the brighter or more intense is the FITD indicator. The FITD indicator may be part of the button to be pressed when activating the pb switch.

This proximity based FITD indication may continue for a period of time and may be discontinued a certain period of time after the proximity signal has disappeared. Of course the operation may be simpler and the proximity signal may be an indication upon which the microchip activates the FITD indicator for a predetermined period, at a predetermined level or only while the user is within a given proximity and the proximity signal is present.

If the user then proceeds and activates the pb MMI switch, the FITD indicator in a preferred embodiment may be deactivated or switched to another level or functional mode under control of the microchip, and the main energy consuming load may be activated by this pb switch activation. The microchip controlling the operational modes may, in a preferred case, be integrated with the microchip interpreting the MMI signals and realizing the touch sensor implementation.

Both the touch sensor and the pb switch signals may be interpreted in terms of time duration of activation and/or deactivation signals and/or sequences of signals.

In simple terms the pb surface that a user must press, may glow (in the dark) when the user brings his/her hand close to the switch. Specific illumination of the pb switch, under these conditions, thus gives rise to a locating signal which assists the user in the location of the switch that must be activated in order to start operation. The pb switch in a specific embodiment must still be pressed to activate the light or main energy consuming load.

The FITD indicator may also be active (at a higher level) after an automatic shut-off has occurred or at least for a short period thereafter.

In another embodiment the activation by proximity results in a different operational mode or for a different time duration than activation by the pb switch.

In a specific embodiment the switching circuit includes a module which houses or comprises the pb switch, the touch sensor, the microchip, the energy consuming load and a FITD indicator that is active when the load is not activated by the user. All the elements may be in close proximity of each other. In another embodiment the elements are each attached to and/or enclosed in the module which may be of any suitable shape or form which depends, at least, on the specific application.

The energy consuming load may for example be an electric motor, a light generating element or a heat generating unit. The power source may be mains power or an exhaustible power source such as a battery or a fuel cell.

In a further embodiment, in accordance with a preceding description, the microchip controls an automatic delayed shut-off function resulting in the load being deactivated a predetermined period after it was activated. The microchip also gives a warning of such imminent shut-off a short period prior to the shut-off. This advance auto shut-off warning may be a single indication, a reduction in power and/or a sequence or repetitive sequence of warning indications. In a specific embodiment the microchip accepts a proximity signal as enough or sufficient indication that the user wishes to extend operation. This may be specifically during or after the warning signals have been activated. In simple terms, for example, once the warning has been given that auto-shut-off is imminent, but before auto-shut-down occurs, the user can reset the auto-off timer by the wave of a hand past the sensor and an actuation of the pb switch is then not necessarily required to extend the period of operation. Feedback may be given to the user that the extension of operation has been accepted by varying operation of the load or some other indication. An example may be that during the advance auto-off warning period the power to the load is reduced and upon resetting the timer, the original power level is restored. In a variation of this embodiment the FITD indicator that operates in response to the proximity signal(s) also gives an indication of the power source level. For example an activating/deactivating sequence or varying colors may be used to indicate the power level.

The combined touch sensor and push button switch technology may also be used in a headlamp or flashlight technology. Again proximity may activate the load or FITD indicator. The load may for example be activated at a reduced power level, or any activation may only be for a very short period of time. In some embodiments the proximity or touch sensor may be used for some commands but not for others, for example in a specific embodiment the touch sensor may not activate or deactivate the flashlight but it can cancel an imminent auto-shut-down. In fact a signal may in some embodiments also be accepted for a short time after such auto shut-off to resume operation and to reset the auto shut-off timer. The same techniques can be implemented for the interior light (or map light) in a vehicle.

It is also possible that the push button switch can affect or activate functions concerning the general operation of the touch sensor. For example, the touch sensor may be forced to adjust its calibration by activations of the push button switch.

In another embodiment a power source (battery) level indicator may be activated whilst a proximity signal is active. This may enable a person to immediately notice the battery level when a product such as an electric toothbrush, shaver, flashlight or other battery operated product is picked up. Again, this indication may be switched off after a period of time. It is also possible that a low power indication or warning is given only when a proximity detection is made, to specifically stand out, when the proximity sensor is triggered.

In a further embodiment the electronics for the proximity touch sensor and a find-in-the-dark indicator are embedded in the casing of a traditional switch mechanism. This may be for example a switch for the defrosting of a window in a vehicle, a turn signal indicator activation mechanism or a window wiper activation lever. When the proximity of a body part (e.g. finger) or another element is detected, the find-in-the-dark indicator is activated in a mode different from normal. For example, it may be normally off and upon the proximity detection the find-in-the-dark indicator may be activated; or it may normally be on in a low mode and upon the proximity detection, the find-in-the-dark indicator may be activated in a higher power or more prominent mode. The find-in-the-dark indicator may be specifically designed to illuminate the contact area of the switch in the vicinity where the user must physically make contact to activate the switch. In some cases, e.g. a lever used to operate a wiper or turn signal indicator, the illumination may be on a front side of the lever to be visible, whilst the contact from the user may be from the bottom, top, side, back or any other direction. An important aspect is that the location of a specific selection mechanism, which enables a specific function to be activated, is indicated to the user before the mechanism is actuated. Alternatively expressed the specific function to be activated by a specific selection mechanism is indicated to the user before the function is selected. This may help prevent accidental activation of a wiper when a turn signal was desired and vice versa. Of course another indication (e.g. audio) may also be used to alert the user as to what switch is being approached or in proximity of a body part. In each instance a second indicator can be used in place of the FITD, or in addition to the FITD. The second indicator is under the control of the microchip and is used to give the user information about a switch near, or combined with, the proximity detection sensor.

It is also proposed that the proximity switch be used to guide the user towards a button or a sequence of buttons likely to be operated next. For example if a radio is installed with this invention and in an off state, the detection of a user finger in proximity of the radio will illuminate the on switch and possibly no other switch, whereas a proximity detection when already on, will illuminate the off switch or volume control switch but not the on switch. In a sense this invention will intuitively lead the user through the next logical options when the switches are approached.

It is also possible for a function or load to be temporally selected, say whilst the proximity detection is made, but to activate the load permanently or for an extended period of time even if the proximity detection is cancelled, the pb switch must be operated.

The aforementioned functions also apply to a mains system with a mains switch fitted with a find-in-the-dark indicator and touch sensor interface or with mains and the system as described previously (FIGS. 13, 14) wherein dc voltage is used to interface with the user and this switch, that is typically a pb switch, is then augmented with a touch sensor interface that functions in combination as described above.

It is also possible for the touch sensor proximity interface plus electronics to control some of the other described functions to be built into a traditional type switch that is for example typically found in a car or in a house. In some embodiments the touch sensor may switch the load on but not off or vice versa.

In each instance a second indicator can be used in place of the FITD, or in addition to the FITD. The second indicator is under the control of the microchip and is used to give the user information about a switch near, or combined with, the proximity detection sensor.

In the prior art the base or ground plate of the capacitive touch sensor is a metal sheet or plate. This may present problems in some products. As such in a further embodiment the sensing plate may be formed by using an electrical current conducting fluid (for example paint or ink) that may be applied to a surface that must form the sensing plate. In another embodiment use is made of stickable tape (e.g. masking tape, cellotape etc.) that offers some electrical conducting characteristics either through its own composition or by embedded metallic structures. It is envisaged that a plastic panel can be painted with this electrical current conducting substance, or manufactured with such current conducting characteristics. This plastic panel can then be utilized as the sense plate.

In another embodiment stickable tape with current conducting features may be provided with a specific surface structure so that when painted over it closely matches a wall it was stuck on. The sides may be formed such, or the wall surface may be machined such, that the presence of the tape is not obvious or easily visible.

In a further embodiment such tape may be positioned around a wall mounted light switch in order to act as a sensing plate to enable proximity detection for activating a find-in-the-dark indicator. In a further embodiment the plate around the wall mounted switch may be formed by applying the current conducting fluid. Normal paint can be applied over these elements to render a normal looking surface.

The fluid may also be applied by spray-painting to, for example, the inside of a plastic lamp base.

Wiring can be attached to either type of element with conducting glue. This may be done through a connector glued or conductively attached to the painted/taped area or with the wire directly attached thereto.

Figure 17:
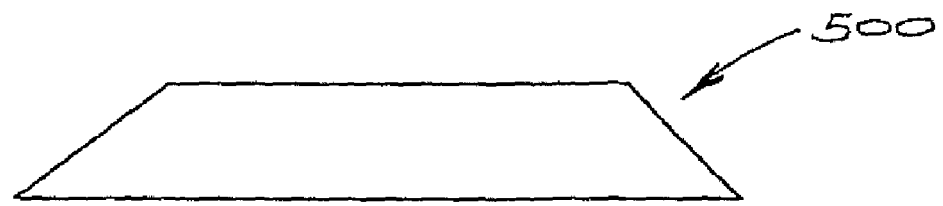
FIGS. 17 and 18 depict the use of current conducting tape.

FIG. 17 indicates in cross section a current conducting tape 500 with a structure that would help to form a less conspicuous attachment to a wall, once painted over. It is also preferable that the tape surface should be similar to that of the normal wall material.

Figure 18:
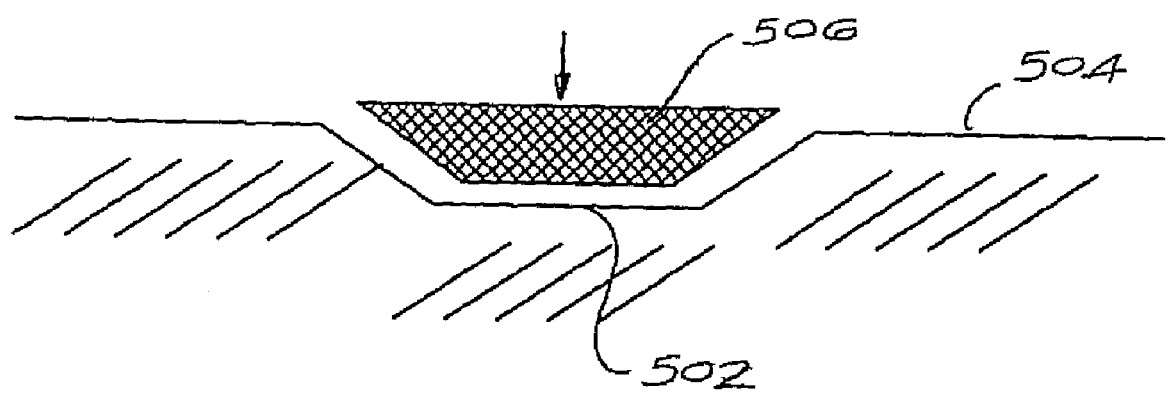

FIG. 18 shows a shallow slot or channel 502 which is ground or otherwise created into a wall surface 504. A current conducting tape 506 of such a design is used that when laid into the slot it results in a very flat surface that should be difficult to detect when painted over or covered by wall paper.

In some embodiments the area covered with the tape or conductive paint, glue, ink, paste etc. is much larger so as to form a plate for the touch sensor or even form two plates of a capacitor for such touch or proximity sensor.

In a specific embodiment of the invention the event of interest is the release of a handheld product rather than the event of proximity or a touch. In this case the normal condition is considered to be the state when the product is held.

Figure 19:
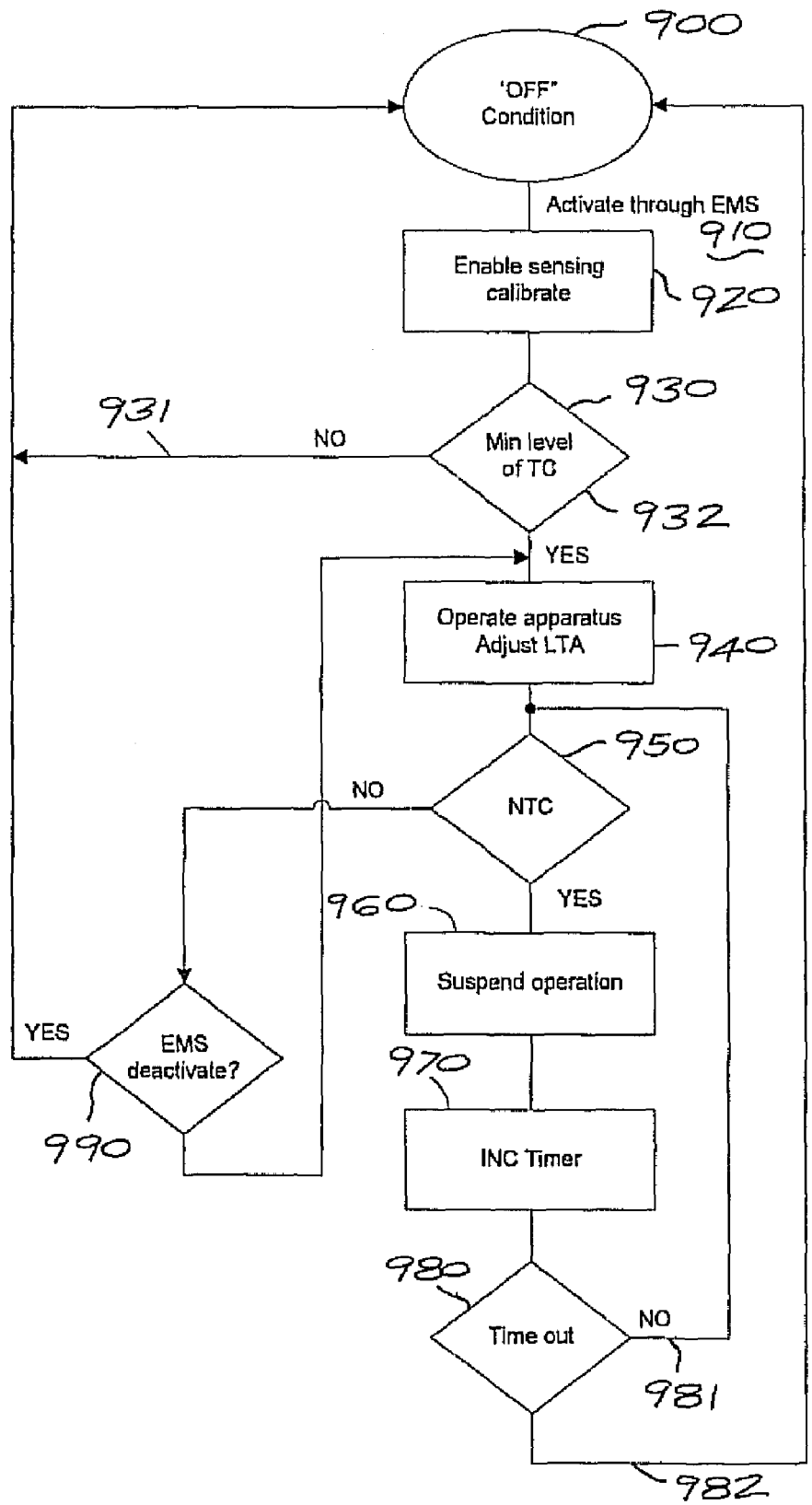
FIG. 19 is a flow chart of operations in a product, according to the invention.

FIG. 19 shows a flow diagram as an example of this operation. This flow diagram may be applied, for example, to a hairdryer, flashlight or a toothbrush.

State (900) is "OFF". In this condition the product is switched off and can only be activated by an electromechanical switch (EMS). This may be an advantage in that it requires very low power. This is advantageous for battery powered products. This can also prevent accidental activation through the proximity/touch sensor interface (TSS).

Once an EMS actuation occurs (910) the product powers (or brings out of sleep mode) a microchip or the section of a microchip that does the TSS functions. In this embodiment it is preferred to perform a fast calibration routine (920) which establishes a reference level for the TSS module. The assumption is that when the EMS actuation occurs, the product is held and should the calibration be done in a short time (say one second) a value can be established for the TSS module.

This reference value can then be compared against a predetermined stored value (930) that can be seen as a minimum level to be reached before the product is regarded as handheld.

If the post-calibration value is too much towards a no touch condition (NTC) the product can be prevented from activating (931). In a capacitive charge transfer type sensor a count which is too high will mean lower capacitance and a lower count will mean the product is held.

If the count is lower than the predetermined value (932) the product is switched on. The step 930 represents an optional action that may be attractive and practical in some cases but not always for all products.

In a step 940 the load is activated and the TSS module compares the current value measure from time to time against the established reference value produced by the routine 920. If the value stays within a predetermined range of this reference value, the product activation is maintained. The current value may also be used to adjust the reference value creating a long term average (LTA) of the sensed parameter.

This LTA adjustment accounts for drift in various parameters and/or environment. However, this adjustment in the normally active TSS configuration is not as important as with the normally NTC (no touch condition) type configurations. This is due to the differing time periods normally associated with the values. A wall switch for a light may be off for days during which there is substantial drift in temperature, humidity etc., whereas a toothbrush is only on for a few minutes.

In FIG. 19 the current measurement is compared (950) against the LTA and if within a predetermined range, the EMS may be checked (in some embodiments the EMS may select further functions) (990). If a deactivation is seen the product switches off and returns to the OFF state 900. If no deactivation is determined in 990, step 940 is repeated.

If in the step 950 a NTC is determined, various actions may be performed, but in the example of FIG. 19, in step 960 the operation of the load is suspended. A timer is activated, incremented (970) and checked (980). If a time-out occurs (982), then the product is switched off.

However, before the time-out, via loop 981, the touch condition (TC) is continuously checked (950). If a TC is sensed again, the product is activated again.

Figure 20:
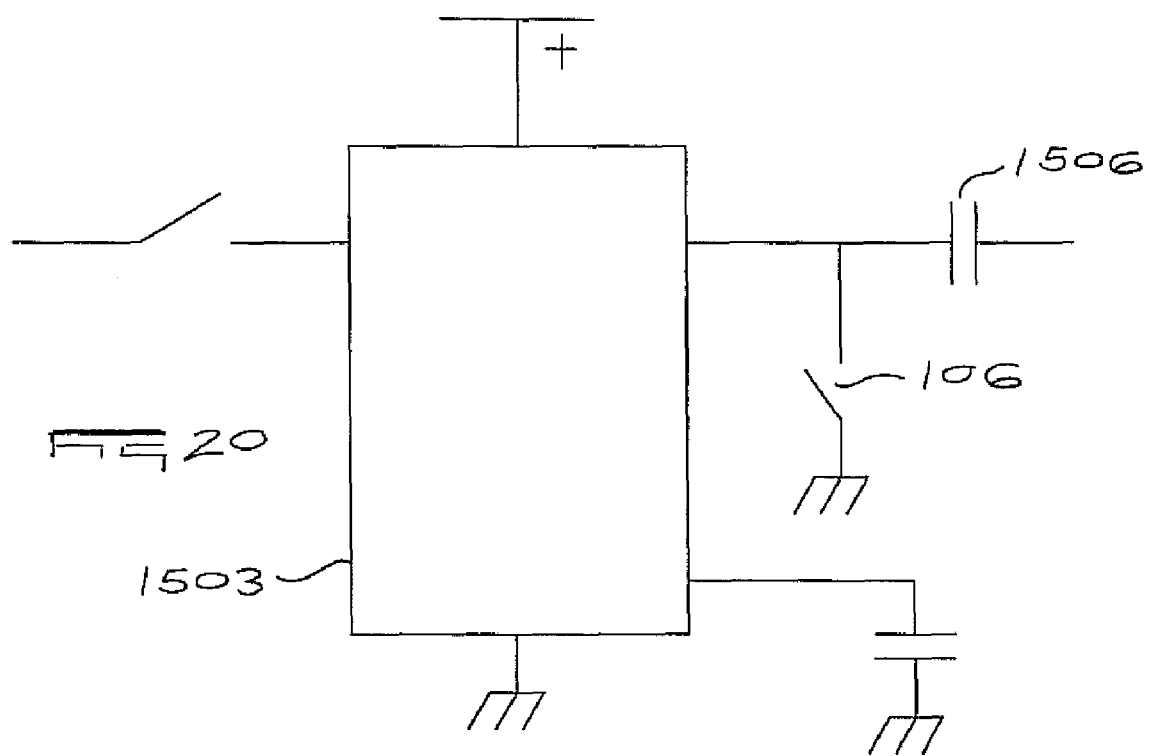
FIGS. 20 and 21 depict possible uses of a switch, according to the invention.
Figure 21:
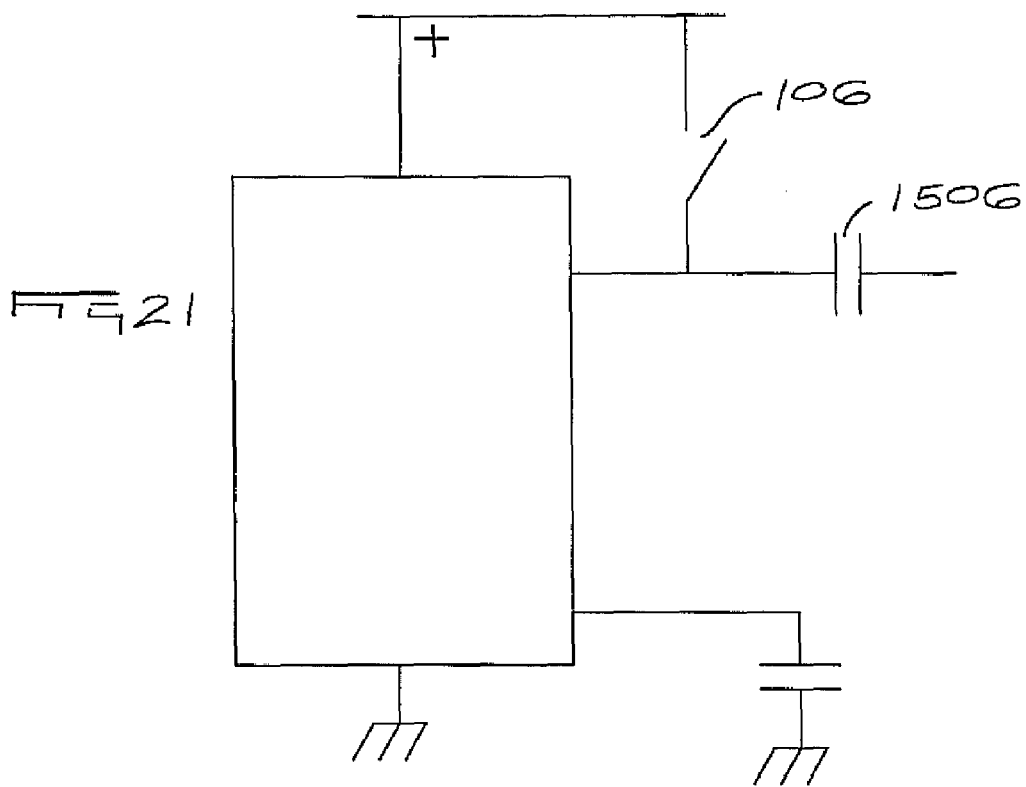

FIGS. 20 and 21 show a microchip 1503, and an input switch 106 and a TSS antenna or plate 1506 which are connected to the same input pin of the microchip and thus work in parallel. In the first case the switch 106 is connected to ground and in the latter case the switch is connected to the supply 101.

While the preferred embodiments of the present invention have been described in detail, it will be appreciated by those of ordinary skill in the art that further changes and modifications can be made to the embodiments without departing from the spirit and scope of the present invention as claimed.

The invention claimed is:

1. An electronic switch module for use in a product with an energy consuming load, said module comprising:
   a microchip;

at least one capacitive sensor forming part of a user interface;

said capacitive sensor at least partially implemented in said microchip;

wherein the electronic switch module is configured to receive signals through the user interface and to interpret such signals as user interface commands; and wherein the capacitive sensor is configured to establish a reference level during a touch condition that is used to determine when a no-touch condition happens, and wherein the capacitive sensor establishes a no-touch reference level during a no-touch condition that is used to determine the occurrence of a proximity/touch event.

2. The electronic switch module of claim 1 wherein the operating mode of the product is automatically changed when a no-touch condition is detected.

3. The electronic switch module of claim 1 wherein the product further comprises a DC power source and RF circuitry.

4. The electronic switch module of claim 1 wherein the detection of a no-touch condition by the capacitive sensor is used to prevent specific commands or functions of the product.

5. The electronic switch module of claim 1 wherein the capacitive sensor differentiates between signals indicating a proximity event and a touch event.

6. The electronic switch module of claim 1 wherein the microchip controls a delayed de-activation of a function that was activated in response to an activation command received through said capacitive sensor user interface.

7. A product employing the electronic switch module of claim 1, said product comprising a casing wherein the electronic switch module, a visible indicator that is activated by the microchip in response to the detection of a proximity event and the load are all attached to or enclosed in said casing.

8. A method of operating a user interface module as part of a product, wherein the user interface module comprises a microchip and at least one capacitive sensor, the method including the steps of:

a) using a capacitive sensing touch reference level, established during a time when a touch condition prevails to determine when a no-touch condition happens; and b) using a capacitive sensing no-touch reference level established during a time when a no-touch condition prevails to determine when a proximity condition or a touch condition happens.

9. The method of claim 8 further including the step of using the same capacitive sensing module to differentiate between proximity and touch events when the reference level used is the no-touch reference level.

10. The method of claim 8 further including the step of halting some functions of the product when a no-touch condition is detected when the reference level used is the touch reference level.

11. The method of claim 10 further including the step of automatically, upon detecting a proximity event, re-activating a function that was de-activated when a no-touch condition was detected.

12. The method of claim 10 further including the step of automatically, upon detecting a touch event, re-activating a function that was de-activated when a no-touch condition was detected.

13. The method of claim 10 further including the step of halting some functions in a way that the functions cannot be re-activated by some touch events, if a no-touch condition prevailed for at least a predefined minimum period of time.

14. The method of claim 8 further including the step of blocking certain commands to the product when a no-touch condition prevails.

15. The method of claim 8 used in a product that comprises a dc power source and radio frequency circuitry.

16. The method of claim 8 further including the step of activating a delayed switch off product function upon detecting a no-touch condition.

17. The method of claim 8 further including the step of changing the operating mode of the product when a no touch condition is detected.

* * * * *